US009228767B2

(12) United States Patent
Hofsdal et al.

(10) Patent No.: US 9,228,767 B2
(45) Date of Patent: Jan. 5, 2016

(54) METHOD FOR DETERMINING PROPER WIRING OF MULTIPLE 3 PHASE MOTORS IN A SINGLE SYSTEM

(75) Inventors: Gilbert B. Hofsdal, Chittenango, NY (US); Lucy Yi Liu, Fayetteville, NY (US); Suresh Duraisamy, Liverpool, NY (US)

(73) Assignee: CARRIER CORPORATION, Farmington, CT (US)

( * ) Notice: Subject to any disclaimer, the term of this patent is extended or adjusted under 35 U.S.C. 154(b) by 235 days.

(21) Appl. No.: 13/814,841

(22) PCT Filed: Sep. 7, 2011

(86) PCT No.: PCT/US2011/050653
§ 371 (c)(1),
(2), (4) Date: Feb. 7, 2013

(87) PCT Pub. No.: WO2012/036948
PCT Pub. Date: Mar. 22, 2012

(65) Prior Publication Data
US 2013/0162177 A1    Jun. 27, 2013

Related U.S. Application Data

(60) Provisional application No. 61/383,153, filed on Sep. 15, 2010.

(51) Int. Cl.
*H02P 1/54* (2006.01)
*H02P 5/00* (2006.01)
*H02P 5/46* (2006.01)
(Continued)

(52) U.S. Cl.
CPC . *F25B 49/00* (2013.01); *H02P 5/00* (2013.01); *H02P 23/0072* (2013.01)

(58) Field of Classification Search
USPC .............................................. 318/34; 62/180
See application file for complete search history.

(56) References Cited

U.S. PATENT DOCUMENTS

| | | | |
|---|---|---|---|
| 4,549,601 A | 10/1985 | Wellman et al. | |
| 4,630,670 A | 12/1986 | Wellman et al. | |

(Continued)

FOREIGN PATENT DOCUMENTS

| | | | | |
|---|---|---|---|---|
| JP | 57055778 A | * | 4/1982 | ................ H02P 1/40 |
| JP | 2000023499 A | * | 1/2000 | ............... H02P 21/00 |

(Continued)

OTHER PUBLICATIONS

International Search Report and Written Opinion for related International Application No. PCT/US11/50653 filed Sep. 7, 2011; report dated Apr. 3, 2013.

*Primary Examiner* — Kawing Chan
(74) *Attorney, Agent, or Firm* — Cantor Colburn LLP (57) ABSTRACT

A method for determining proper wiring of multiple three-phase motors in a refrigeration system is disclosed. The method may include energizing a plurality of three-phase motors with a first input phase rotation and recording performance data, energizing the plurality of three-phase motors with a second input phase rotation and recording the performance data, evaluating the performance data and determining if each of three-phase motors is properly wired, operating the refrigeration system in a normal mode if all of the three-phase motors are properly wired, or operating the refrigeration system in a less efficient mode if at least one three-phase motor is improperly wired.

20 Claims, 5 Drawing Sheets

(51) Int. Cl.
  *F25B 49/00* (2006.01)
  *H02P 23/00* (2006.01)

(56) References Cited

U.S. PATENT DOCUMENTS

| | | | |
|---|---|---|---|
| 4,698,981 A * | 10/1987 | Kaneko et al. | 62/180 |
| 5,009,075 A | 4/1991 | Okoren | |
| 5,249,429 A | 10/1993 | Hanson | |
| 5,331,944 A | 7/1994 | Kujawa et al. | |
| 5,458,011 A | 10/1995 | Thompson | |
| 5,623,190 A | 4/1997 | Tajima et al. | |
| 5,689,963 A * | 11/1997 | Bahel et al. | 62/129 |
| 6,210,119 B1 | 4/2001 | Lifson et al. | |
| 7,134,290 B2 * | 11/2006 | Awwad et al. | 318/400.09 |
| 7,462,999 B2 | 12/2008 | Mitchell et al. | |
| 7,481,140 B2 | 1/2009 | Gass et al. | |
| 7,498,545 B2 * | 3/2009 | Fukasaku et al. | 219/497 |
| 7,783,387 B2 * | 8/2010 | Calcagno | 700/264 |
| 8,295,950 B1 * | 10/2012 | Wordsworth et al. | 700/22 |
| 2003/0000236 A1 | 1/2003 | Anderson et al. | |
| 2003/0218443 A1 * | 11/2003 | Nakamichi et al. | 318/685 |
| 2004/0093879 A1 * | 5/2004 | Street et al. | 62/151 |
| 2005/0039483 A1 | 2/2005 | Yun et al. | |
| 2006/0010892 A1 | 1/2006 | Awwad et al. | |
| 2009/0210072 A1 | 8/2009 | Gass et al. | |
| 2009/0236012 A1 | 9/2009 | Gass et al. | |
| 2013/0134917 A1 * | 5/2013 | Kaneko | 318/490 |

FOREIGN PATENT DOCUMENTS

| | | |
|---|---|---|
| JP | 2008-64331 | 3/2008 |
| WO | WO-2010/002644 A1 | 1/2010 |

* cited by examiner

| BASIC COMPONENT PRIORITY LEVEL |||| 
|---|---|---|---|
| UNIT (COMPRESSOR CONFIGURATION) | COMPRESSOR MOTOR | CONDENSER MOTOR | EVAPORATOR MOTOR |
| RECIP | 3 | 2 | 1 |
| SCROLL | 1 | 3 | 2 |
| SCREW | 1 | 3 | 2 |
| ROTORY | 1 | 3 | 2 |
| GEAR | 1 | 3 | 2 |

| EXAMPLE EXEMPTION CONDITION COMPONENT PRIORITY LEVEL ||||
|---|---|---|---|
| | HIGH AMBIENT |||
| UNIT (COMPRESSOR CONFIGURATION) | COMPRESSOR MOTOR | CONDENSER MOTOR | EVAPORATOR MOTOR |
| RECIP | 3 | 1 | 2 |
| SCROLL | 1 | 2 | 3 |
| SCREW | 1 | 2 | 3 |
| ROTORY | 1 | 2 | 3 |
| GEAR | 1 | 2 | 3 |

FIG. 5

METHOD FOR DETERMINING PROPER WIRING OF MULTIPLE 3 PHASE MOTORS IN A SINGLE SYSTEM

CROSS-REFERENCE TO RELATED APPLICATIONS

This application is a 35 U.S.C §371 U.S. national stage filing of International Patent Application No. PCT/US11/50653 filed on Sep. 7, 2011 claiming priority under the Paris Convention and 35 U.S.C. §119(e) to U.S. Provisional Patent Application Ser. No. 61/383,153 filed on Sep. 15, 2010.

FIELD OF THE DISCLOSURE

The present disclosure generally relates to three-phase motors and, in particular, relates to a method for determining proper wiring of multiple three-phase motors in a refrigeration system.

BACKGROUND OF THE DISCLOSURE

Refrigeration systems are commonly used for cooling a desired area. Refrigeration works by removing heat from an enclosed area and transferring that heat to an external atmosphere located outside of the enclosed area. Refrigeration systems are widely used in refrigerators, air-conditioning units in homes and automobiles, and cargo areas of ships and trucks.

Figure 1:
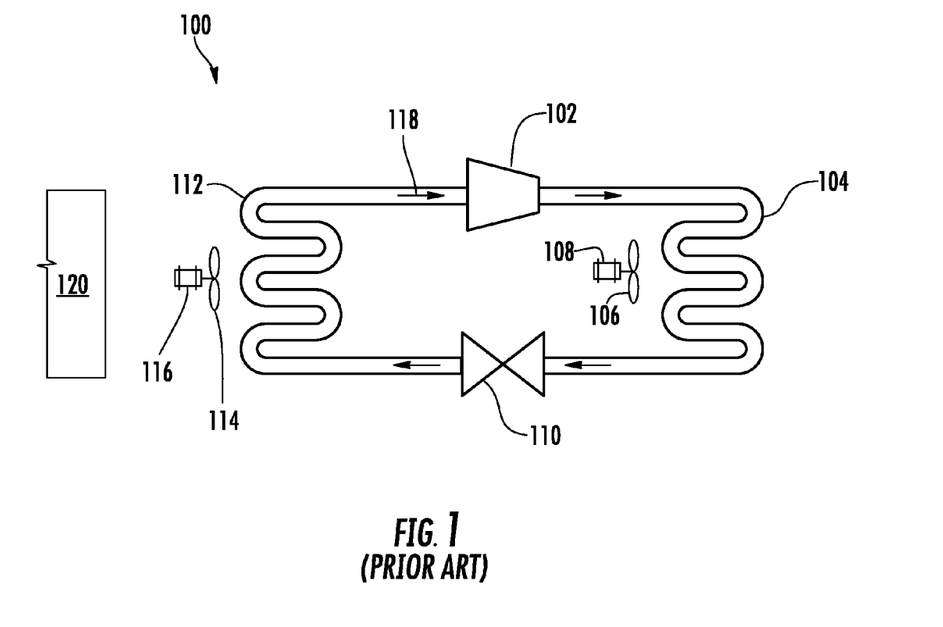
FIG. 1 is a block diagram of an embodiment of a refrigeration system constructed in accordance with the teachings of the prior art.

FIG. 1 illustrates a block diagram of a basic refrigeration system 100. The refrigeration system 100 includes a compressor 102, a condenser coil 104, a condenser fan 106 with a condenser motor 108, an expansion valve 110, an evaporator coil 112, an evaporator fan 114 with an evaporator motor 116, and refrigerant 118. Refrigerant is a fluid used to absorb and transfer heat. Refrigerant absorbs heat by evaporating from a liquid to a gas at a low temperature and pressure. Refrigerant releases heat by condensing from gas back to liquid at a higher temperature and pressure.

Refrigerant 118 enters the compressor 102 in a low-temperature, low-pressure gas state. The compressor 102 compresses the refrigerant 118 to a high-temperature, high-pressure gas state. The refrigerant 118 then flows through the condenser coil 104, wherein the refrigerant 118 releases heat until liquefied. Heat in the refrigerant 118 is rejected by the condenser coil 104. The condenser fan 106 circulates ambient air across the condenser coil 104, transferring heat from the condenser coil 104 to the external atmosphere. The expansion valve 110 then reduces the pressure of the refrigerant 118 as the refrigerant 118 flows through the expansion valve 110, creating a low-temperature, low-pressure mixture of liquid and vapor refrigerant. The low-temperature, low-pressure refrigerant mixture 118 then flows through the evaporator coil 112. The evaporator fan 114 draws warm air from a desired area to be cooled 120 across the evaporator coil 112 carrying the cold refrigerant mixture 118. Heat is then absorbed by the refrigerant 118 as it flows through the evaporator coil 112. As the refrigerant 118 absorbs the heat, the refrigerant 118 changes phase from liquid back to gas. The cycle then repeats.

In order for the refrigerant 118 to absorb and reject the maximum amount of heat, the components in the refrigeration system 100 should operate efficiently if the compressor 102, the condenser motor 108, and the evaporator motor 116 are all driven by three-phase motors. Three-phase motors are widely used because they are efficient, economical, and durable. Three-phase motors work by introducing three electrical phases through terminals, each of the phases energize an individual terminal and reach a maximum at different times within a cycle.

Figure 2:
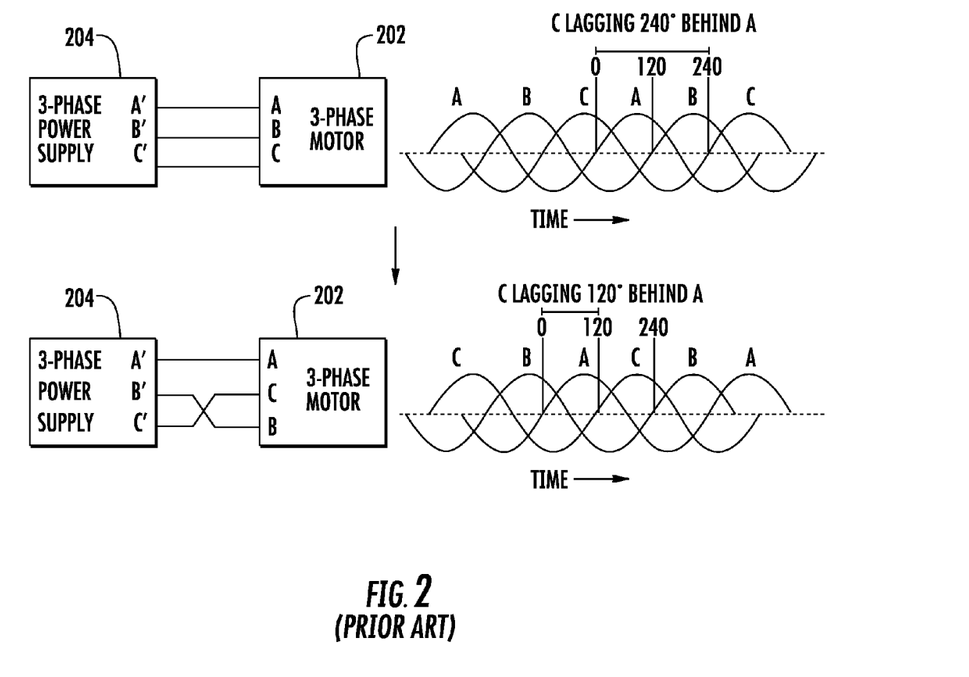
FIG. 2 is a block diagram illustrating wiring between a three-phase power supply and a three-phase motor, as well as graphically representation of phase rotations constructed in accordance with the teachings of the prior art.

In FIG. 2, a three-phase motor 202 has three terminals labeled as A, B, and C. Terminals are energized, wherein terminal B is lagging 120° behind terminal A, and terminal C is lagging 120° behind terminal B and 240° behind terminal A. Thus, each of the terminals A, B, and C are energized 120° apart from each other. The terminals A, B, C are energized by a three-phase power supply 204, which also has three terminals A', B', and C'. The terminals A', B', C' of the three-phase power supply 204 determine the phase rotation of the terminals. The phase rotation determines the rotation of the three-phase motor 202. For example, if terminals A', B', C' of the three-phase power supply 204 are wired to the terminals A, B, C of the three-phase motor 202, respectively, and have a phase rotation of A', B', and C', then terminals A, B, C have the same phase rotation and the three-phase motor 202 rotates clockwise. In clockwise rotation, terminal C lags 240° behind terminal A.

However, if the terminals A, B, C of the three-phase motor 202 are improperly wired to the terminals A', B', C' of the three-phase power supply 204, then the three-phase motor 202 will rotate counter-clockwise (i.e. "in reverse"). For instance, if terminals B and C are swapped wherein terminal B is wired to terminal C' and terminal C is wired to B', then energizing terminals A', B', C' will result in terminals A, C, B being energized. Swapping two terminals will result in a 120° phase shift, i.e. C would lag 120° behind A. A phase shift of 120° will cause the three-phase motor 202 to rotate in reverse.

Reverse rotation of three-phase motors will reduce efficiency and may even cause damage to some of the components driven by these motors in refrigeration systems. For example, a scroll compressor may be damaged if operated in reverse rotation. By contrast, a reciprocating compressor may run in either direction without being effected if equipped with a reversible oil pump. If a condenser motor or an evaporator motor operates in reverse, then condenser fan or evaporator fan efficiency will decrease and impact heat transfer efficiency of the heat exchanger. For instance, if the evaporator fan operates inefficiently, then adequate heat will not be drawn from the area to be cooled, and the refrigeration unit will have lower cooling capacity. While the refrigeration system will still operate when the condenser motor operates in reverse, the heat rejection capacity of the condenser coil will decrease. Therefore, depending on the components that these motors drive, each of the three-phase motors in a refrigeration system are impacted by improper wiring differently. In a single system with multiple three-phase motors, it is important to determine the priority of operation for each of these three-phase motors.

SUMMARY OF THE DISCLOSURE

In accordance with one aspect of the disclosure, a three-phase component wiring recognition apparatus in a single system is disclosed. The three-phase component wiring recognition apparatus may include at least one terminal configured to operatively coupled to a plurality of three-phase components, and a controller operatively coupled to the terminal. The controller configured to determining a phase rotation for each of the three-phase components, operating the system in a normal mode if the phase rotation for each of the plurality of three-phase components being the same, or if the phase rotation for at least one three-phase component is different, then operating the system in a less efficient mode by determining a priority phase rotation for the system.

In accordance with another aspect of the disclosure, a method for determining proper phasing of multiple three-phase components in a refrigeration system is disclosed. The method may include energizing a plurality of three-phase components, determining a phase rotation for each of the three-phase components, operating the refrigeration system in a normal mode if the phase rotation for each of the plurality of three-phase components is the same, or if the phase rotation for at least one three-phase component is different, then operating the refrigeration system in a less efficient mode by determining a priority phase rotation for each of the three-phase components in the refrigeration system.

In accordance with yet another aspect of the disclosure, a method for determining proper wiring of multiple three-phase motors in a refrigeration system is disclosed. The method may include energizing a plurality of three-phase motors with a first input phase rotation and recording performance data, energizing the plurality of three-phase motors with a second input phase rotation and recording the performance data, evaluating the performance data, and determining if the plurality of three-phase motors are properly wired. If each of the plurality of three-phase motors are properly wired, then operating the refrigeration system in a normal mode. Otherwise, if at least one three-phase motor is improperly wired, then operating the refrigeration system in a less efficient mode.

In the less efficient mode, the method may further include triggering an alert specifying improper wiring of at least one three-phase motor, selecting a priority phase rotation for the refrigeration system, wherein each of the plurality of three-phase motors are prioritized based on parameters selected from a decision matrix, running the refrigeration system based on the priority phase rotation selected, monitoring the parameters, and adapting the priority phase rotation based on changes detected in the parameters.

Other advantages and features will be apparent from the following detailed description when read in conjunction with the attached drawings.

BRIEF DESCRIPTION OF THE DRAWINGS

For a more complete understanding of the disclosed system and method, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and systems or which render other details difficult to perceive may have been omitted. It should be understood, of course, that this disclosure is not limited to the particular embodiments illustrated herein.

DETAILED DESCRIPTION OF THE DISCLOSURE

Figure 3:
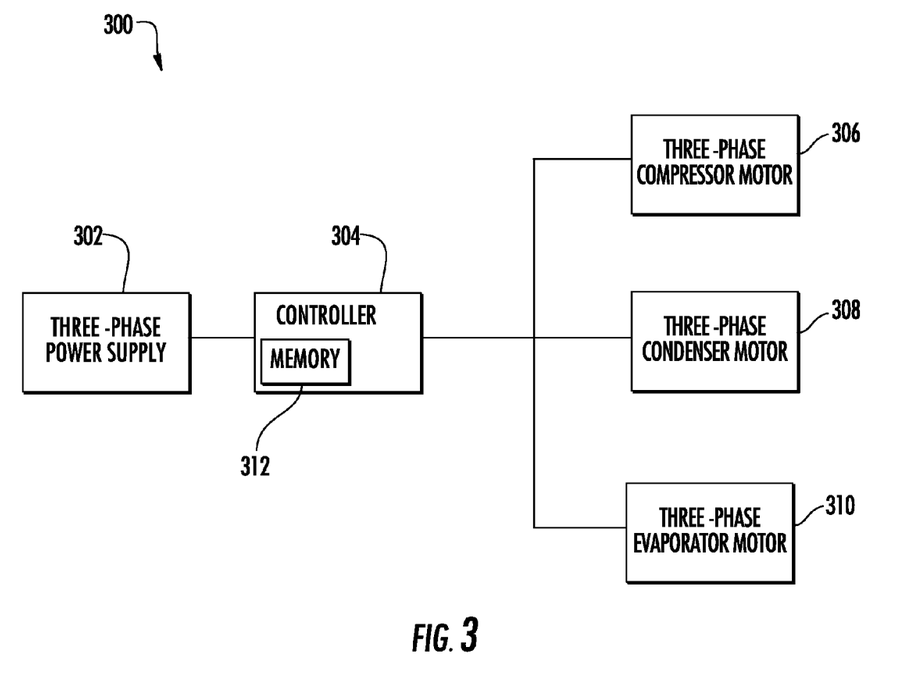
FIG. 3 is a block diagram of a portion of an embodiment of a refrigeration system constructed in accordance with the teachings of the present disclosure.

Referring to FIG. 3, a simplified block diagram showing the interconnection between a three-phase power supply 302, a controller 304, and three-phase motors 306, 308, 310 in a refrigeration system 300 is illustrated. In FIG. 3, the non-motor operated devices in the refrigeration system 300 have been omitted. The following description may be made with reference to a refrigeration system, but it should be understood that the present disclosure contemplates incorporation with any other single system containing multiple three-phase components as well.

In FIG. 3, the refrigeration system 300 may include the three-phase compressor motor 306, the three-phase condenser motor 308, the three-phase evaporator motor 310, and the controller 304. The three-phase motors 306, 308, 310 may be all operatively coupled to the controller 304. The controller may have a memory 312 capable of storing algorithms and data. The controller 304 may process stored algorithms, analyze the performance of the motors 306, 308, 310, and control the motors 306, 308, 310. It should be understood that the controller 304 may be any type of device capable of storing, processing, and controlling such as, but not limited to, a microprocessor, microcontroller, and core processing unit (CPU).

The controller 304 may also be operatively coupled to the three-phase power supply 302. In one exemplary embodiment, the three-phase power supply 302 may obtain power from a power grid, an electrical generator, or any other device capable of distributing three-phase power. The three-phase power supply 302 may have three terminals A', B', C' distributing power 120° out-of-phase from each other. The terminals A', B', C' may be connected to the refrigeration system 300 through the controller 304 to each of the three-phase motors 306, 308, 310. Each of the three-phase motors 306, 308, 310 also may have three terminals A, B, C. The controller 304 may be capable of drawing power from the terminals A', B', C' of the three-phase power supply 302 and distributing that power to the terminals A, B, C of the three-phase motors 306, 308, 310 in a desired phase rotation.

Thus, in the event that the terminals A, B, C of any of the three-phase motors 306, 308, 310 may be wired improperly, the controller 304 may be capable of applying the phase rotation needed to operate the improperly wired motor properly. In one exemplary embodiment, improper wiring may occur, when servicing the refrigeration system 300, by replacing any of the three-phase motors 306, 308, 310 and not wiring the terminals A, B, C to the corresponding terminals A', B', C' of the three-phase power supply 302 correctly. The controller 304 may be capable of determining the proper wiring of the three-phase motors 306, 308, 310 by operating an algorithm, further disclosed in FIG. 4.

Figure 4:
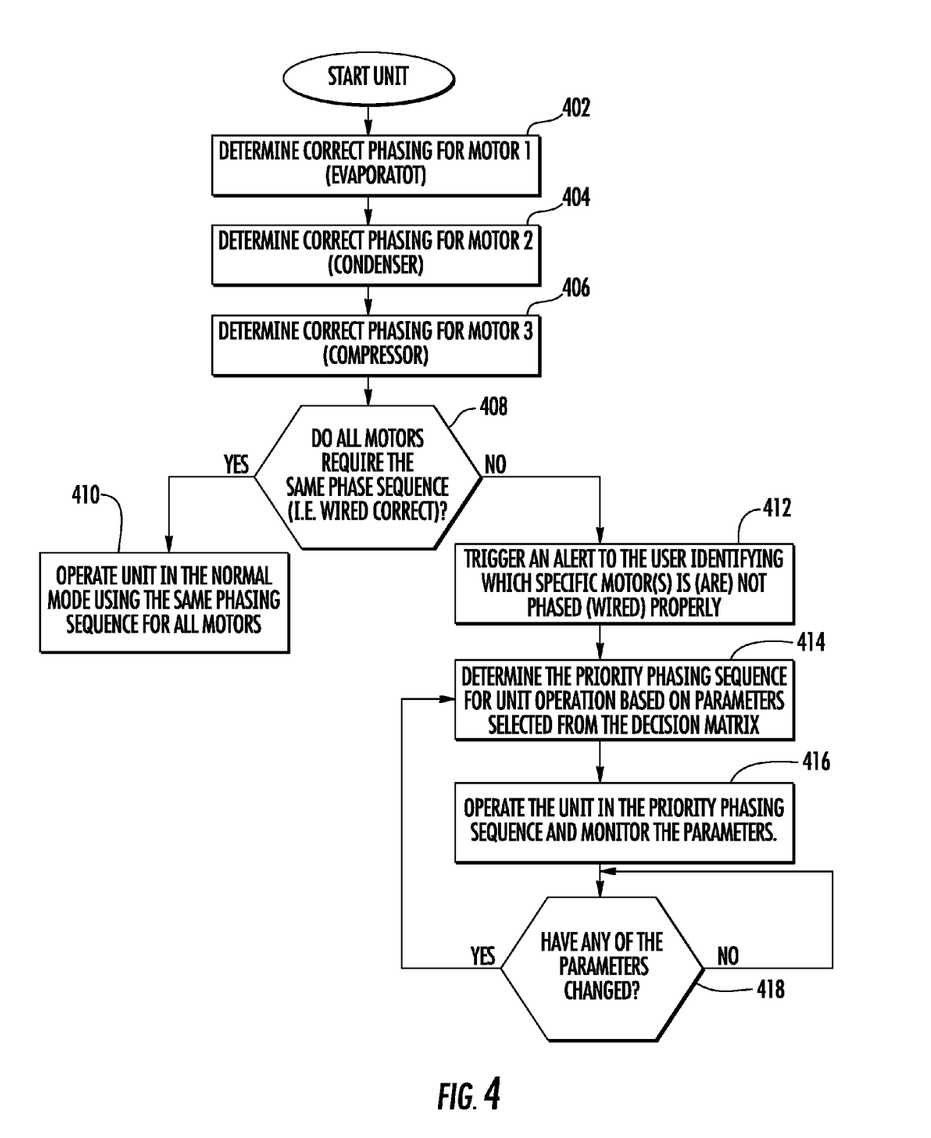
FIG. 4 is a flowchart depicting a sample sequence of steps which may be practiced in accordance with the method of the present disclosure.

Referring now to FIG. 4, step 402 represents the controller 304 determining a correct phase rotation for a first motor, which may be the three-phase evaporator fan motor 310. In one exemplary embodiment, the controller 304 may determine the correct phase rotation for the first motor 310 by energizing the first motor 310 with a first input phase rotation. The first input phase rotation may consist of energizing terminal A, B, and C of the first motor 310, in that order with each terminal being 120° out-of-phase from each other. The controller 304 may then measure and record performance of the first motor 310. In one exemplary embodiment, the performance of the first motor 310, i.e. evaporator fan motor, may be measured by measuring the supply and return air temperature across the evaporator coil. The controller 304 may then energize the first motor 310 with a second input phase rotation. The second input phase rotation may consist of energizing terminal A, C, and B of the first motor 310, in that order with each terminal being 120° out-of-phase from each other. By swapping two terminals B and C, the second input phase rotation may be 120° out-of-phase from the first input phase rotation. The second input phase rotation may cause the first motor 310 to rotate in a reverse direction from the first input phase rotation. The controller 304 may then measure and record the evaporator coil performance as a result of the first motor 310 operating in the reverse direction.

Once the first motor 310 has rotated in either direction and the evaporator coil performance data has been recorded, the controller 304 may then determine which direction may result in an optimal performance of the evaporator coil. The controller 304 may then determine the correct phase rotation for the second motor, i.e. the condenser fan motor 308, in step 404 and the third motor, i.e. the compressor motor 306, in step 406 in a similar manner as in step 402. One minor exception to step 402 that may be performed differently in step 404 and step 406 may be the method of measuring the response data of each rotation. Depending on the type of motor, the method of measuring the response data may be different. In one exemplary embodiment, in step 404, the controller 304 may measure the response of the second motor 308 by measuring its current draw. It should be understood that the method of measuring the response data may be dependent on the type of motor and components they drive, and that it should not be limited to the methods disclosed herein.

Once the controller 304 has determined the correct phase rotation for each of the three-phase motors 306, 308, 310, the controller 304 may then determine if all the three-phase motors 306, 308, 310 require the same phase rotation, i.e. are all motors wired correctly, in step 408. If all the three-phase motors 306, 308, 310 require the same phase rotation, then the refrigeration system 300 may run in a normal mode with one phase rotation applied to all the three-phase motors 306, 308, 310, in step 410. In one exemplary embodiment, running the refrigeration system 300 in the normal mode may require all the three-phase motors 306, 308, 310 to operate with phase rotation A, B, C.

However, if at least one of the three-phase motors 306, 308, 310 requires a different phase rotation than that of at least one other three-phase motor, then the refrigeration system 300 may run in a less efficient mode as disclosed in steps 412-418. In one exemplary embodiment, the refrigeration system 300 may run in the less efficient mode when the evaporator motor 310 requires phase rotation A, C, B, while the compressor motor 306 and the condenser motor 308 require phase rotation A, B, C. In the less efficient mode, in step 412, the controller 304 may trigger an alert to the user indicating which specific three-phase motor(s) may not be phased, i.e. wired, properly. In one exemplary embodiment, the alert may be triggered on a display such as, but not limited to, a LED screen, a LCD monitor, or any other device capable of displaying information to the user. In another exemplary embodiment, the alert may be triggered remotely such as, but not limited to, transmitting wirelessly via radio frequency (RF), Bluetooth, or infrared (IR).

Figure 5:
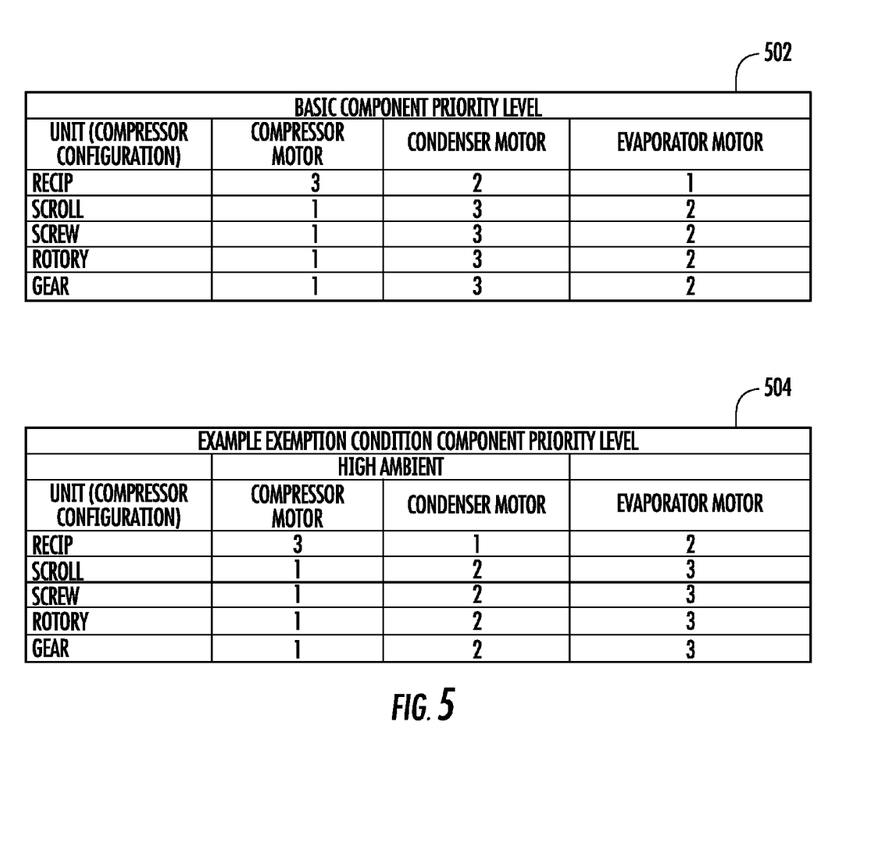
FIG. 5 is a decision matrix depicting two sample priority tables which may be practiced in accordance with the method of the present disclosure.

Once the alert has been triggered, the controller 304 may then determine a priority phase rotation for the refrigeration system 300, in step 414. Since all the three-phase motors 306, 308, 310 are not operating with the same phase rotation, the controller 304 may then determine which one of the three-phase motors 306, 308, 310 should receive priority in order to operate the refrigeration system 300 efficiently. The priority phase rotation may be assigned to the refrigeration system 300 based on parameters selected from a decision matrix. In FIG. 5, decision matrixes 502, 504 may be disclosed in accordance with one exemplary embodiment of the present disclosure.

The decision matrix 502 may depict a basic priority phase rotation based on the parameters—motor type and efficiency. For instance, depending on the type of compressor motor 306, the priority phase rotation may be influenced. In one exemplary embodiment, if the compressor motor 306 is a reciprocating compressor, then the priority phase rotation may assign the lowest priority (3) to the compressor motor 306, while the condenser motor 308 may receive priority level (2), and the evaporator motor 310 may receive the highest priority (1). In another exemplary embodiment, if the compressor motor 306 is a scroll, screw, or rotary compressor, then the priority phase rotation may assign the highest priority (1) to the compressor motor 306, followed by the evaporator motor 310 receiving priority level (2), and finally the lowest priority (3) being assigned to the condenser motor 308.

One reason for the parameter, motor type, having such an effect on the priority phase rotation may be that some components that motors drive may not operate in the reverse direction, while other components that motors drive may merely run inefficiently, or experience no impact on their performance. Reciprocating compressors equipped with a reversible oil pump can operate in either direction without affecting performance, while scroll, screw, and rotary compressors can not operate properly in the reverse direction and may cause damage to the compressor, a high cost component. Furthermore, the parameter, the efficiency of the component being driven by the motor, may play an important role in determining the priority phase rotation for the refrigeration system 300 as well. For example, if the condenser fan motor 308 were to operate in reverse, heat from the refrigeration system 300 would still be expelled out into the external atmosphere, just not as efficiently. Nevertheless, the refrigeration system 300 may still operate in the less efficient mode with minimal impact. However, if the evaporator motor 310 were to operate in reverse, not as much heat would be drawn from the area desired to be cooled, and the refrigeration system 300 would not cool sufficiently. Thus, operating the evaporator fan motor 310 with the correct phase rotation takes precedence over the condenser fan motor 308.

However, other parameters may influence the basic priority phase rotation as disclosed in the decision matrix 502. In one exemplary embodiment, high ambient temperature (e.g. 80° F. or higher) surrounding the refrigeration system 300 may affect the priority phase rotation. In FIG. 5, the decision matrix 504 depicts the priority phase rotation for the refrigeration system 300 based on the parameters—the efficiency of the components the motors drive under high ambient temperatures. In high ambient temperatures, the condenser fan motor 308 may take precedence over the evaporator fan motor 310 because the need to expel heat from the condenser may be higher priority for the refrigeration system 300 to operate effectively. It should be understood that other parameters such as, but not limited to, cargo type (e.g. perishable or frozen cargo), compressor discharge pressure, and cargo dehumidification requirements may also play an important role in determining the priority phase rotation.

Returning now to step 416, once the priority phase rotation is selected, the refrigeration system 300 may operate in that priority phase rotation, while the controller 304 may monitor any changes in the parameters. In one exemplary embodiment, operating the refrigeration system 300 in the selected priority phase rotation may entail not only operating the priority three-phase motor in that priority phase rotation, but also the remaining three-phase motors in the refrigeration system 300. Thus, all the three-phase motors 306, 308, 310 in the refrigeration system 300 may operate in the priority phase rotation as they have been assigned. Moreover, in one exemplary embodiment, the parameters may be monitored remotely on a LCD monitor by transmitting wirelessly via RF, Bluetooth, or IR. In step 418, the controller 304 may continue to monitor the parameters until a change may be detected, upon which the controller 304 may refer back to step 414 to determine a new priority phase rotation based on the changes detected in the parameters.

Furthermore, it should be understood that although the method for determining proper wiring of multiple three-phase motors for a single system is described herein in reference to only three motors 306, 308, 310, fewer or more motors may also be incorporated to operate in accordance with the present method disclosed.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A three-phase component wiring detection apparatus for use with a system having at least a first three-phase component and a second three-phase component, the apparatus comprising:
    at least one terminal configured to operatively couple to the first three-phase component and the second three-phase component; and
    a controller operatively coupled to the terminal, the controller configured to:
        determine a phase rotation for each of the three-phase components;
        operate the system in a normal mode when the phase rotation for each of the three-phase components is the same; and
        operate the system in a less efficient mode when the phase rotation for the first three-phase component is different from the second three-phase component, the less efficient mode including determining a priority phase rotation for the system wherein one of the first three-phase component and the second three-phase component is assigned highest priority and operating the system in the priority phase rotation wherein the three-phase component assigned highest priority operates properly and the other three-phase component operates in reverse.

2. The apparatus of claim 1, wherein the priority phase rotation is determined by parameters selected from a decision matrix.

3. The apparatus of claim 2, wherein the parameters are selected from a group consisting of three-phase component type, cargo type, compressor discharge pressure, ambient temperature, and cargo dehumidification requirements.

4. The apparatus of claim 2, wherein the controller is further configured to monitor the parameters and update the priority phase rotation upon changes detected in the parameters.

5. The apparatus of claim 4, wherein the controller is further configured to monitor the parameters remotely.

6. The apparatus of claim 1, wherein the controller is further configured to trigger an alert specifying improper phase rotation of at least one three-phase component.

7. The apparatus of claim 6, wherein the alert is displayed remotely.

8. The apparatus of claim 1, wherein the controller is further configured to determine the phase rotation for each of the three-phase components by:
    energizing the first and second three-phase components with a first input phase rotation and recording a first set of performance data;
    energizing the first and second three-phase components with a second input phase rotation and recording a second set of performance data; and
    evaluating the first and second sets of performance data and assigning an optimal phase rotation for each of the plurality of three-phase components.

9. The apparatus of claim 8, wherein the second input phase rotation is out-of-phase by 120° from the first input phase rotation.

10. A method for determining proper phasing of components in a refrigeration system, the refrigeration system including at least a first three-phase component and a second three-phase component, the method comprising:
    energizing each of the three-phase components;
    determining a phase rotation for each of the three-phase components;
    operating the refrigeration system in a normal mode when the phase rotation for each of the three-phase components is the same; and
    operating the refrigeration system in a less efficient mode when the phase rotation for the first three-phase component is different from the second three-phase component, the less efficient mode including determining a priority phase rotation for the refrigeration system wherein one of the first three-phase component and the second three-phase component is assigned highest priority and operating the refrigeration system in the priority phase rotation wherein the three-phase component assigned highest priority operates properly and the other three-phase component operates in reverse.

11. The method of claim 10, wherein the priority phase rotation is determined by parameters selected from a decision matrix.

12. The method of claim 11, wherein the parameters are selected from a group consisting of three-phase component type, cargo type, compressor discharge pressure, ambient temperature, and cargo dehumidification requirements.

13. The method of claim 11, further comprising monitoring the parameters and updating the priority phase rotation upon changes detected in the parameters.

14. The method of claim 10, further comprising triggering an alert specifying improper phase rotation of at least one of the first and second three-phase components, wherein the alert is displayed remotely.

15. A method for determining proper wiring of components in a refrigeration system, the refrigeration system including at least a first three-phase motor and a second three-phase motor, the method comprising:
    energizing each of the three-phase motors with a first input phase rotation and recording a first set of performance data;
    energizing each of the three-phase motors with a second input phase rotation and recording a second set of performance data;
    evaluating the first and second sets of performance data and determining if the three-phase motors are properly wired;
    operating the refrigeration system in a normal mode when each of the three-phase motors is properly wired; and operating the refrigeration system in a less efficient mode when at least one three-phase motor is improperly wired wherein the less efficient mode includes selecting a priority phase rotation for the refrigeration system, wherein each of the three-phase motors is prioritized based on parameters selected from a decision matrix, and running the refrigeration system based on the priority phase rotation selected.

16. The method of claim 15, wherein the less efficient mode further comprises:
   triggering an alert specifying improper wiring of at least one three-phase motor;
   monitoring the parameters and updating the priority phase rotation based on changes detected in the parameters.

17. The method of claim 16, wherein the parameters are selected from a group consisting of three-phase component type, cargo type, compressor discharge pressure, ambient temperature, and cargo dehumidification requirements.

18. The method of claim 16, wherein the alert is displayed remotely.

19. The method of claim 16, wherein monitoring the parameters is performed remotely.

20. The method of claim 15, wherein the second input phase rotation is out-of-phase by 120° from the first input phase rotation.

* * * * *